(12) United States Patent
Takahashi et al.

(10) Patent No.: US 6,683,992 B2
(45) Date of Patent: Jan. 27, 2004

(54) IMAGE DECODING APPARATUS AND IMAGE CODING APPARATUS

(75) Inventors: Toshiya Takahashi, Osaka (JP); Hiroaki Toida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 581 days.

(21) Appl. No.: 09/749,755

(22) Filed: Dec. 28, 2000

(65) Prior Publication Data

US 2001/0005432 A1 Jun. 28, 2001

(30) Foreign Application Priority Data

Dec. 28, 1999 (JP) .............................................. 11-374843

(51) Int. Cl.$^7$ ................................................. G06K 9/00
(52) U.S. Cl. ....................... 382/243; 382/247; 382/246; 382/233; 382/165; 345/630; 375/240.08
(58) Field of Search ................................. 382/243, 247, 382/246, 233, 166, 165; 345/555, 630; 348/384.1; 358/426.01–426.1; 375/122, 240.1–240.2; 708/203

(56) References Cited

U.S. PATENT DOCUMENTS

| | | | | |
|---|---|---|---|---|
| 6,233,279 B1 | * | 5/2001 | Boon ..................... | 375/240.08 |
| 6,459,814 B1 | * | 10/2002 | Li et al. .................. | 382/240 |
| 6,483,521 B1 | * | 11/2002 | Takahashi et al. ........... | 345/630 |
| 6,501,861 B1 | * | 12/2002 | Cho et al. .................. | 382/243 |
| 6,571,019 B1 | * | 5/2003 | Kim et al. .................. | 382/246 |
| 6,577,679 B1 | * | 6/2003 | Apostolopoulos ......... | 375/240.12 |
| 6,618,444 B1 | * | 9/2003 | Haskell et al. ........... | 375/240.24 |
| 2001/0036229 A1 | * | 11/2001 | Chen et al. ............. | 375/240.08 |
| 2002/0051488 A1 | * | 5/2002 | Li ........................... | 375/240 |
| 2003/0108099 A1 | * | 6/2003 | Nagumo et al. ........... | 375/240 |

OTHER PUBLICATIONS

MPEG AV Decoder LSI for Digital Broadcasting, Matsushita Technical Journal vol. 45 No. 2, Apr. 1999.

* cited by examiner

*Primary Examiner*—Bhavesh M. Mehta
*Assistant Examiner*—Barry Choobin
(74) *Attorney, Agent, or Firm*—Wenderoth, Lind & Ponack, L.L.P.

(57) ABSTRACT

A decoding LSI adaptable to MPEG4 is provided with a padding means for performing padding on decoded texture data, an arithmetic decoding means for performing arithmetic decoding on coded shape data, and a composition means for compositing a plurality of texture data to generate composite image data. The padding means, the arithmetic decoding means, and the composition means are implemented by hardware circuits, i.e., a padding engine, an arithmetic decoding engine, and a composition engine, respectively. Therefore, the decoding LSI can perform high-speed decoding on a bitstream corresponding to plural objects, such as images, which are compressively coded by the MPEG4 coding method, with reduced cost of the hardware circuits performing the decoding process.

16 Claims, 10 Drawing Sheets

|    | C9 | C8 | C7 |    |
|----|----|----|----|----|
| C6 | C5 | C4 | C3 | C2 |
| C1 | C0 | x  |    |    |

● pixels having non-transparent shape information
○ pixels having transparent shape information
◎ padding with average value
⊙ padding with values of pixels having non-transparent shape information

IMAGE DECODING APPARATUS AND IMAGE CODING APPARATUS

FIELD OF THE INVENTION

The present invention relates to an image decoding apparatus and an image coding apparatus and, more particularly, to those using hardware circuits which realize high-speed decoding and coding in object units.

BACKGROUND OF THE INVENTION

As the digitization of image data goes forward, apparatuses for compressive coding, transmission, and extensive decoding of image data have been put to practical use. The MPEG2, a global standard, is generally used as a compressive coding method, and various kinds of LSI apparatuses have been released as apparatuses performing coding or decoding adaptable to the MPEG2.

Hereinafter, an example of a conventional image decoding apparatus performing the MPEG2 decoding will be described with reference to the drawings (refer to "MPEG AV Decoder LSI for Digital Broadcasting", Hirotoshi Uehara, Shoichi Goto, et al., Matsushita Technical Journal Vol. 45, No. 2, April 1999, pp. 17–24).

FIG. 9 is a block diagram illustrating the construction of a decoding LSI 800 which is a decoding apparatus adaptable to the MPEG2.

The decoding LSI 800 includes a setup processor 801 for controlling the respective components of the decoding LSI 800; a stream IF 809 for receiving a bitstream obtained by subjecting digital image data to MPEG2 coding; a variable-length decoding engine 802 for subjecting the bitstream to variable-length decoding; and an IDCT engine 803 for subjecting frequency-domain image data obtained by the variable-length decoding to inverse discrete cosine transform (IDCT) to generate space-domain image data. The decoding LSI 800 generates reproduced image data on the basis of the space-domain image data and predictive image data.

The decoding LSI 800 further includes a motion compensation engine 804 for subjecting the reproduced image data to motion compensation to generate the above-mentioned predictive image data; a memory 806 for storing the bitstream, the space-domain image data, the predictive image data, and the reproduced image data; a memory controller 805 for controlling access to data stored in the memory 806; a video IF 808 for outputting the reproduced image data to a display unit (not shown); and an I/O control processor 807 for controlling the video IF 808 on the basis of a control signal from the memory controller 805.

The variable-length decoding engine 802, the IDCT engine 803, and the motion compensation engine 804 are respectively constituted by hardware circuits.

Next, the operation of the decoding LSI 800 will be described.

When a bitstream obtained by subjecting digital image data to MPEG2 compressive coding is input to the stream IF 809, the bitstream is stored in the memory 806 through the memory controller 805.

In the setup processor 801, the header of the bitstream stored in the memory 806 is detected, and decoding on this part is started. Although this decoding on the bitstream is performed according to the MPEG2 decoding procedure, the setup processor 801 basically performs decoding on the header and general control as a sequencer.

Decoding on the part following the header of the bitstream is sequentially performed by the variable-length decoding engine 802, the IDCT engine 803, and the motion compensation engine 804. The result of the decoding, i.e., reproduced image data, is temporarily stored in the memory 806.

The video IF 808 reads the already-decoded image data (reproduced image data) from the memory 806 according to a display time, under control of the I/O control processor 807, and outputs it to the display unit.

The reason why variable-length decoding, IDCT, and motion compensation are performed by dedicated engines is because each of these processes is a fixed simple process with less branch-on condition and has considerable computational complexity.

Since the calculations with considerable arithmetic loads are performed by the dedicated engines and the respective engines are arranged so that the flow of data between these engines goes along the arithmetic processes in the decoding, a small-scale LSI capable of high-speed processing is realized.

Recently, the MPEG4 coding, which is suitable for low-bitrate transmission and is able to perform high-performance image processing, has been standardized.

The MPEG4 coding differs from the MPEG2 coding in that the conception of object coding is introduced in the MPEG4 coding. In the object coding, an image is divided into objects such as a foreground and a background, and compressive coding, data transmission, and extensive decoding are performed object by object, and decoded image data corresponding to the respective objects are composited for display. Data to be subjected to object coding are as follows: texture data indicating the luminance or chrominance of an image, corresponding to MPEG2 image data, and shape data indicating the shape of the image.

FIG. 10 is a diagram illustrating functional blocks for realizing an algorithm for decoding a bitstream which is obtained by compressively coding digital image data according to the MPEG4 coding.

In FIG. 10, reference numeral 900 denotes a decoding apparatus for decoding a bitstream including coded texture data and coded shape data. This decoding apparatus 900 includes a decoder 90 for decoding a bitstream corresponding to a foreground to output decoded texture data and decoded shape data; and a decoder 9 for decoding a bitstream corresponding to a background to output decoded texture data and decoded shape data. Further, reference numeral 92 denotes an image in a texture image space comprising the decoded texture data outputted from the decoder 90, and 93 denotes an image in a shape image space comprising the decoded shape data outputted from the decoder 90. Further, reference numeral 94 denotes an image in a texture image space comprising the decoded texture data outputted from the decoder 9, and 95 denotes an image in a shape image space comprising the decoded shape data outputted from the decoder 9.

The decoding apparatus 900 further includes a composition means 91 for generating composite image data corresponding to a composite image 96 which is obtained by superimposing the foreground on the background, on the basis of the decoded texture data and decoded shape data outputted from the respective decoders 90 and 9.

The decoding unit 90 further includes a variable-length decoding means 901 for subjecting the bitstream corresponding to the foreground to variable-length decoding, and outputting compressed texture data, compressed motion vector information, and arithmetically-coded shape data; and a motion vector decoding means 904 from decoding the compressed motion vector information to output a motion vector.

Further, the decoder 90 includes an inverse quantization means 902 for subjecting the compressed texture data to inverse quantization; an inverse DCT means 903 for subjecting the inversely-quantized data to inverse DCT to output space-domain texture data; and an addition means 911 for adding the space-domain texture data and predictive texture data to output decoded texture data. Furthermore, the decoder 90 includes a padding means 906 for padding the decoded texture data; a memory 907 for storing the output from the padding means 906; and a motion compensation means 905 for motion-compensating the padded texture data stored in the memory 907 on the basis of the motion vector to generate the above-mentioned predictive texture data.

Moreover, the decoder 90 includes a shape arithmetic decoding means 908 for subjecting the arithmetically-coded shape data to arithmetic decoding on the basis of predictive shape data to output decoded shape data; a memory 910 for storing the decoded shape data; and a motion compensation means 909 for motion-compensating the decoded shape data stored in the memory 910 on the basis of the motion vector to generate the above-mentioned predictive shape data.

The construction of the decoder 9 is identical to that of the decoder 90 and, therefore, does not require repeated description.

Next, the operation will be described.

When the bitstream corresponding to the foreground is input to the decoder 90 and the bitstream corresponding to the background is input to the decoder 9, the respective decoders 90 and 9 decode the coded texture data and the coded shape data included in the bitstream. Thereby, the decoder 90 outputs decoded texture data and decoded shape data corresponding to the foreground, and the decoder 9 outputs decoded texture data and decoded shape data corresponding to the background.

The composition means 91 composites the decoded texture data between the foreground and the background on the basis of the decoded shape data of the foreground and the background, and outputs the composite image data to the display unit (not shown), whereby the composite image 96 is displayed.

When performing composition of the foreground and the background, the shape information of these objects are required, and the decoded texture data of the respective objects as well as the decoded shape data are supplied to the composition means 91.

In order to perform the object-by-object decoding as described above, the shape information corresponding to the respective objects and the texture information corresponding to the non-rectangle object like the foreground are required. Therefore, the functional block (decoder 90) adaptable to the MPEG4 decoding requires the shape arithmetic decoding means 908 for performing arithmetic decoding to decode the shape information and the padding means 906 for performing padding on the decoded texture data corresponding to the foreground having an arbitrary shape to make the foreground have a rectangle shape, in addition to the inverse quantization means 902, the inverse DCT means 903, the motion vector decoding means 904, the texture motion compensation means 905, and the memory 907 which are also included in the functional block adaptable to the MPEG2 decoding.

However, the MPEG2 decoding LSI shown in FIG. 9 cannot efficiently perform the MPEG4 decoding shown in FIG. 10.

That is, although the variable-length decoding, inverse DCT, and motion compensation are common between the MPEG2 and the MPEG4, the MPEG2 functional block does not have means for performing the processes of padding, shape-decoding, and composition which are newly introduced into the MPEG4 processing.

It is thought that these processes may be implemented by a general-purpose processor like the setup processor 801 included in the MPEG2 decoding LSI. However, these processes include many branches performing different arithmetic operations depending on the conditions and, further, there occur many accesses to data in the processor. Therefore, high-speed decoding cannot be achieved by the decoding LSI. Furthermore, a decoding LSI having a high operation frequency is required to realize the MPEG4 decoding, and this increases the cost of the decoding apparatus.

SUMMARY OF THE INVENTION

The present invention is made to solve the above-described problems and has an object to provide an image decoding apparatus that can perform high-speed decoding on a bitstream corresponding to plural objects such as images, which are compressively coded according to the MPEG4 coding method, and that can minimize the cost of hardware circuits performing the decoding process.

Another object of the present invention is to provide an image coding apparatus that can perform high-speed MPEG4 coding on digital data corresponding to plural objects such as images, and that can minimize the cost of hardware circuits performing the coding process.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image decoding apparatus for decoding coded image data which includes coded texture data obtained by coding texture data expressing the luminance or chrominance of an image, and coded shape data obtained by coding shape data expressing the shape of the image, thereby generating decoded image data including decoded texture data and decoded shape data. This apparatus comprises arithmetic decoding means for subjecting the coded shape data to arithmetic decoding to output the decoded shape data; padding means for padding the pixel values of pixels positioned outside a target image to be decoded, in an image space including the target image, which image space is constituted by the decoded texture data; composition means for compositing the decoded texture data of the target image and texture data of another image; at least one of the arithmetic decoding means, the padding means, and the composition means being constituted by a hardware circuit; and a processor for controlling the hardware circuit.

According to a second aspect of the present invention, there is provided an image decoding apparatus including an arithmetic decoding means which comprises a hardware circuit, performs arithmetic decoding on coded shape data obtained by performing arithmetic coding on shape data expressing the shape of an image, and outputs decoded shape data. The hardware circuit comprises a probability calculator for calculating the probability that a target pixel to be subjected to arithmetic decoding has a predetermined pixel value, in a shape image space corresponding to the shape data, on the basis of the pixel values of plural pixels which have already been subjected to arithmetic decoding; an arithmetic decoder for calculating the pixel value of the target pixel on the basis of the coded shape data, and the probability of the target image which is output from the probability calculator; and a data output unit for outputting the pixel values outputted from the arithmetic decoder, for every predetermined number of pixels at the same time.

According to a third aspect of the present invention, in the image decoding apparatus of the second aspect, the hardware circuit constituting the arithmetic decoding means allows parallel processing among calculation of probability by the probability calculator, calculation of pixel values by the arithmetic decoder, and output of pixel values by the data output unit.

According to a fourth aspect of the present invention, in the image decoding apparatus of the second aspect, the hardware circuit constituting the arithmetic decoding means performs calculation of probability by the probability calculator, calculation of pixel values by the arithmetic decoder, and output of the pixel values by the data output unit, for every predetermined number of pixels.

According to a fifth aspect of the present invention, in the image decoding apparatus of the second aspect, the data output unit has a data storage for storing the pixel values outputted from the arithmetic decoder, for every predetermined number of pixels as a unit, and the unit of pixels to be stored in the data storage is equivalent to the data width which is the number of data to be parallel-accessed to a processor controlling the hardware circuit or a memory storing the coded shape data and the decoded shape data.

According to a sixth aspect of the present invention, in the image decoding apparatus of the second aspect, the data output unit has a data storage for storing the pixel values outputted from the arithmetic decoder, for every predetermined number of pixels as a unit, and the unit of pixels to be stored in the data storage is a multiple of the number of pixels in one pixel line in a rectangle image space comprising a predetermined number of pixels as a unit of the arithmetic decoding.

According to a seventh aspect of the present invention in the image decoding apparatus of the second aspect, the data output unit comprises a data storage for storing the pixel values outputted from the arithmetic decoder, for every predetermined number of pixels as a unit of storage; and a shape information decision circuit for deciding whether or not the pixel values constituting the unit of storage are pixels outside the image.

According to an eighth aspect of the present invention, in the image decoding apparatus of the first aspect, the processor decides a padding method according to the inputted shape data, and outputs information indicating the decided padding method to the padding means, and the padding means performs padding on the basis of the decided padding method.

According to a ninth aspect of the present invention, in the image decoding apparatus of the first aspect, the padding means performs padding with, as a unit, a multiple of the number of pixels in one pixel line in a rectangle image space comprising a predetermined number of pixels as a unit of the arithmetic decoding.

According to a tenth aspect of the present invention, there is provided an image decoding apparatus for decoding coded image data which includes coded texture data obtained by coding texture data expressing the luminance or chrominance of an image, and coded shape data obtained by coding shape data expressing the shape of the image, thereby generating decoded image data including decoded texture data and decoded shape data. This apparatus includes padding means comprising a hardware circuit, for padding the pixel values of pixels positioned outside the image, in an image space comprising the decoded texture data. The hardware circuit constituting the padding means comprises a pointer controller for deciding whether each pixel is a pixel inside the image or a pixel outside the image in the image space, using the decoded shape data, and indicating pixels to be used for padding; an average calculator for calculating the average of the pixel values of the pixels indicated by the pointer controller; and a data processor for generating padding pixel values on the basis of the pixel values of the pixels indicated by the pointer controller, the average calculated by the average calculator, and the decoded shape data and decoded texture data, and padding the pixel values of pixels to be padded with the padding pixel values.

According to an eleventh aspect of the present invention, in the image decoding apparatus of the tenth aspect, the padding means allows parallel processing among designation of pixels by the pointer controller, average calculation by the average calculator, and padding of pixel values by the data processor.

According to a twelfth aspect of the present invention, in the image decoding apparatus of the tenth aspect, the padding means performs padding for every block comprising a predetermined number of pixels in the image space, and the padding means is provided with a memory for storing already-decoded pixel values which are required for padding of blocks to be processed after a target block which is currently subjected to padding.

According to a thirteenth aspect of the present invention, in the image decoding apparatus of the first aspect, the composition means receives decoded texture data corresponding to a target image to be decoded, decoded shape data corresponding to the target image, and texture data corresponding to another image to be used for composition, and composites the decoded texture data of the target image and the texture data of the other image on the basis of the decoded shape data, and outputs composite texture data.

According to a fourteenth aspect of the present invention, in the image decoding apparatus of the first aspect, the composition means composites, as a single unit, images to be displayed at the same time.

According to a fifteenth aspect of the present invention, there is provided an image coding apparatus for subjecting texture data expressing the luminance or chrominance of an image and shape data expressing the shape of the image to coding including object decoding, thereby outputting coded shape data and coded texture data and generating object decoded image data including object decoded shape data and object decoded texture data. This apparatus comprises arithmetic coding means for subjecting the shape data to arithmetic coding including object arithmetic decoding, thereby outputting the coded shape data and generating the object decoded shape data; padding means for padding the pixel values of pixels positioned outside the image, in an image space comprising the object decoded texture data; at least one of the arithmetic coding means and the padding means being constituted by a hardware circuit; and a processor for controlling the hardware circuit.

According to a sixteenth aspect of the present invention, there is provided an image coding apparatus for subjecting texture data expressing the luminance or chrominance of an image and shape data expressing the shape of the image to coding including object decoding, thereby outputting coded shape data and coded texture data and generating object decoded image data including object decoded shape data and object decoded texture data. This apparatus includes padding means comprising a hardware circuit, for padding the pixel values of pixels positioned outside the image, in an image space comprising the object decoded texture data. The hardware circuit constituting the padding means comprises a pointer controller for deciding whether each pixel is a pixel inside the image or a pixel outside the image by using the object decoded shape data, and indicating pixels to be used for padding; an average calculator for calculating the average of the pixel values of the pixels indicated by the pointer controller; and a data processor for generating padding pixel values on the basis of the pixel values of the pixels indicated by the pointer controller, the average calculated by the average calculator, and the object decoded shape data and object decoded texture data, and padding the pixel values of pixels to be padded with the padding pixel values.

DETAILED DESCRIPTION OF THE PREFERRED EMBODIMENTS

[Embodiment 1]

Figure 1:
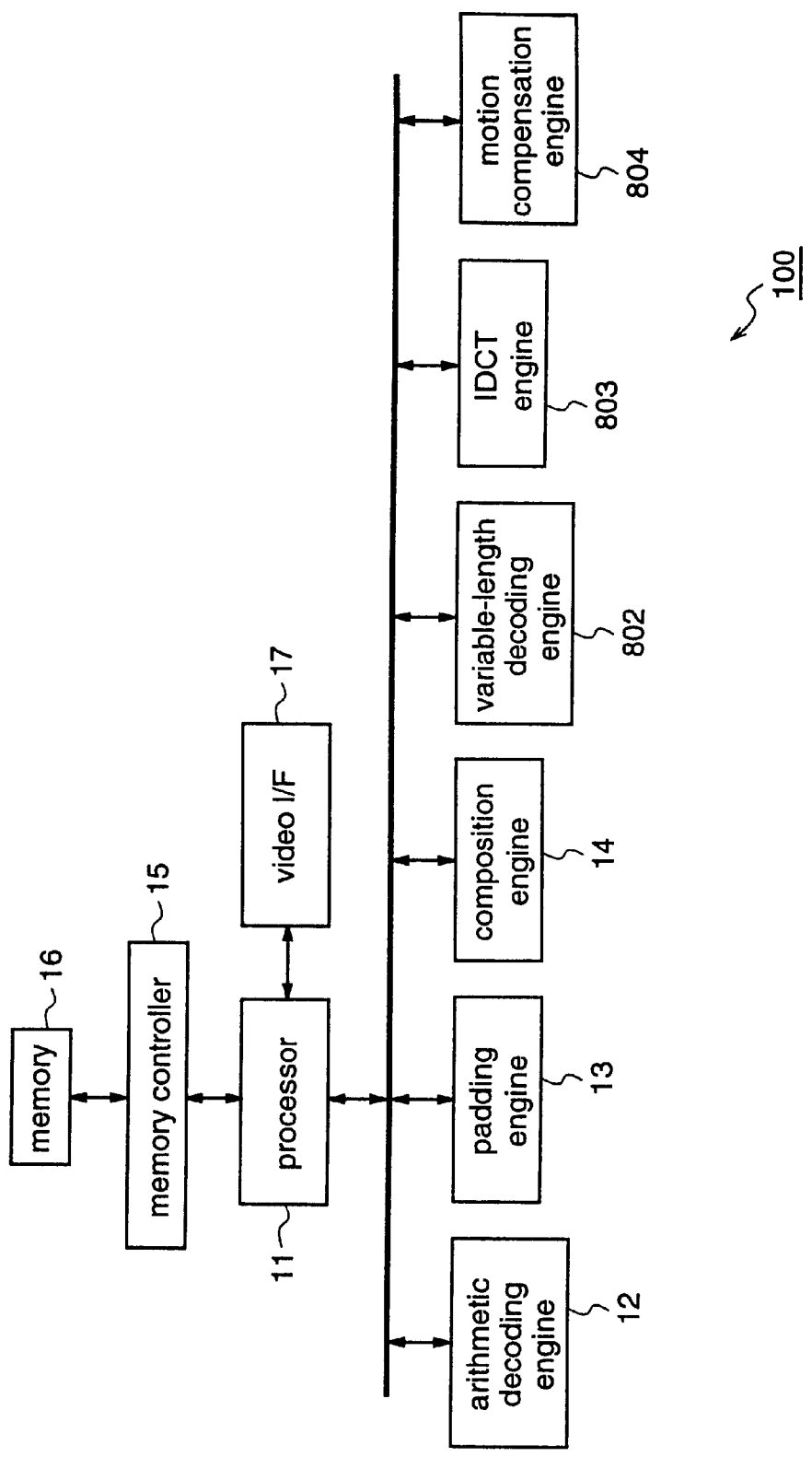
FIG. 1 is a block diagram for explaining an image decoding apparatus according to a first embodiment of the present invention.

FIG. 1 is a block diagram for explaining an image decoding apparatus according to a first embodiment of the present invention.

A decoding LSI 100 as an image decoding apparatus adaptable to MPEG4 includes a processor 11 for controlling the respective components of the decoding LSI 100; a variable-length decoding engine 802 for performing variable-length decoding on a bitstream including coded texture data and coded shape data which are obtained by performing MPEG4 coding on digital image data corresponding to an object; and an IDCT engine 803 for performing inverse discrete cosine transform (IDCT) on frequency-domain texture data obtained by the variable-length decoding, to generate space-domain texture data. The decoding LSI 100 generates decoded texture data on the basis of the space-domain texture data and predictive texture data, and outputs the decoded texture data.

The decoding LSI 100 further includes a motion compensation engine 804 for performing motion compensation on the decoded texture data to generate the above-mentioned predictive texture data; a memory 16 for storing the bitstream, the space-domain texture data, the predictive texture data, and the decoded texture data; a memory controller 15 for controlling access to the data stored in the memory 16; and a video IF 17 for outputting the decoded texture data to a display unit (not shown). The video IF 17 is controlled by the processor 11 according to a control signal supplied from the memory controller 15.

The decoding LSI 100 further includes an arithmetic decoding engine 12 for performing arithmetic decoding on the coded shape data outputted from the variable-length decoding engine 802; a padding engine 13 for performing padding on the decoded texture data; and a composition engine 14 for compositing the decoded texture data. The padded texture data is stored in the memory 16.

The variable-length decoding engine 802, the IDCT engine 803, the motion compensation engine 804, the arithmetic decoding engine 12, the padding engine 13, and the composition engine 14 are respectively constructed by hardware circuits.

As described above, the image decoding apparatus (decoding LSI) according to the first embodiment is provided with the plural engines dedicated to the respective processes unique to MPEG4 (i.e., the arithmetic decoding engine 12, the padding engine 13, and the composition engine 14), in addition to the variable-length decoding engine 802, the IDCT engine 803, and the motion compensation engine 804 which are also included in the conventional image decoding apparatus (decoding LSI) 800.

Next, the operation of the decoding LSI 100 will be described with respect to only the processes different from those of the conventional MPEG2 decoding LSI 800.

When a bitstream obtained by subjecting digital image data, to MPEG4 compressive coding is input to the processor 11, the bitstream is stored in the memory 16 through the memory controller 15.

Then, the bitstream is decoded according to the MPEG4 decoding procedure, by the processor 11 and the respective engines.

Hereinafter, the processes specific to the MPEG4 decoding procedure will be described.

Among the coded texture data stored in the memory 16, non-rectangle texture data is padded by the padding engine 13 to be converted to rectangle texture data. The padded texture data is stored in the memory 16. Then, the motion compensation engine 804 performs motion compensation on the padded texture data stored in the memory 16.

On the other hand, the coded shape data is separated from the bitstream when it is subjected to variable-length decoding, and supplied to the arithmetic decoding engine 12. In the arithmetic decoding engine 12, the coded shape data is subjected to arithmetic decoding to be converted to decoded shape data.

In the arithmetic decoding, it cannot be decided how many bits of data correspond to the shape data equivalent to one unit of coding unless the coded shape data is once decoded.

Since, in MPEG4, a unit of arithmetic decoding is a macroblock (16 pixels×16 lines), arithmetic decoding on each macroblock is performed simultaneously with variable-length decoding.

After the coded texture data and the coded shape data are decoded, the composition engine 14 composites the texture data corresponding to the objects by using the decoded texture data and the decoded shape data which are obtained in the above-mentioned decoding process, and composite image data so obtained is output to the display unit (not shown) through the video IF 17.

Figure 2:
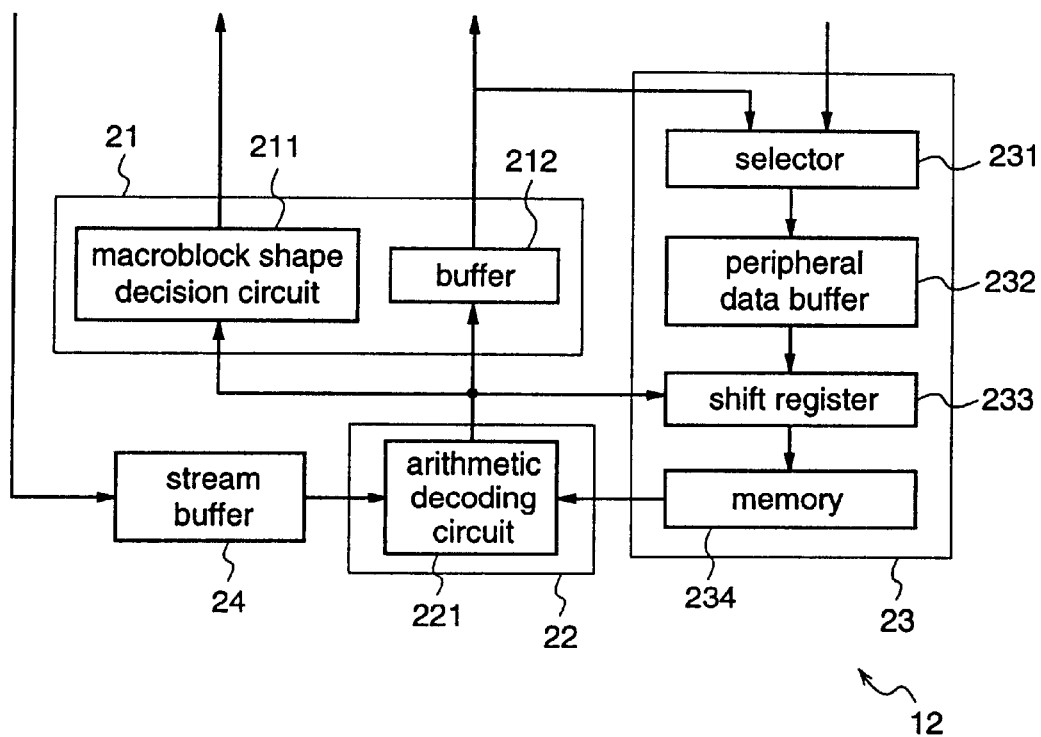
FIG. 2 is a block diagram illustrating an example of an arithmetic decoding engine as one of components of the image decoding apparatus according to the first embodiment.

FIG. 2 is a block diagram illustrating an example of the arithmetic decoding engine 12.

The arithmetic engine 12 comprises a stream buffer 24 for storing the coded shape data obtained by variable-length decoding; a probability calculator 23 for calculating the probability that a target pixel to be decoded has a predetermined pixel value in the shape image space corresponding to the coded shape data; an arithmetic decoder 22 for subjecting the coded shape data to arithmetic decoding on the basis of the probability outputted from the probability calculator 23; and a data output unit for storing the output (decoded shape data) from the arithmetic decoder 22.

The data output unit 21, the arithmetic decoder 22, and the probability calculator 23 are independently operable.

Figures 3, 4:
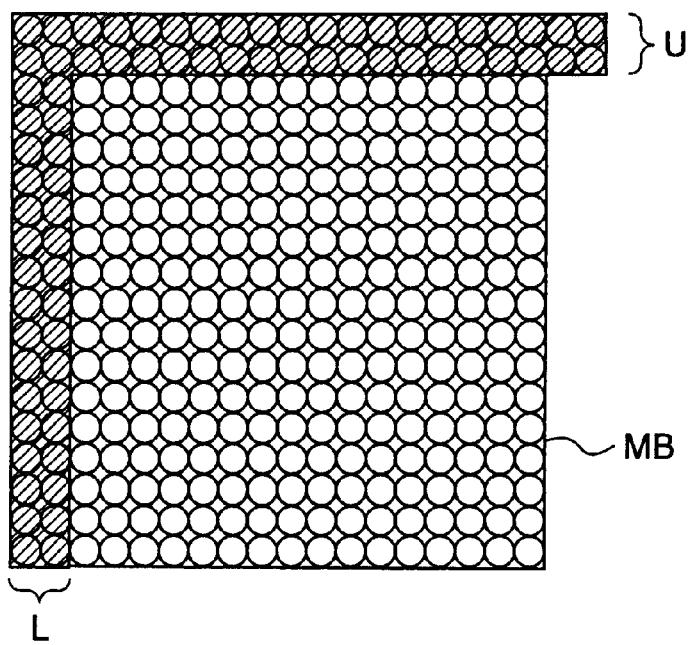
FIG. 3 is a schematic diagram for explaining the operation of the arithmetic decoding engine shown in FIG. 2.
FIG. 4 is a schematic diagram for explaining the operation of the arithmetic decoding engine shown in FIG. 2.

FIGS. 3 and 4 are schematic diagrams for explaining the arithmetic decoding method.

In FIG. 3, X and C0–C9 are pixels in the shape image space, and the pixels C0–C9 are pixels which have already been subjected to arithmetic decoding while the pixel X is a target pixel to be subjected to arithmetic decoding.

In the MPEG4 arithmetic decoding, initially, the probability calculator 23 calculates the probability that the pixel value of the target pixel X is 0 or 1, on the basis of the pixel values of the pixels C0–C9 positioned in the vicinity of the target pixel X.

At this time, three lines of data in the shape image space (shape pixel values) are stored in a shift register 233, and a pointer indicating the pixels C0–C9 to be referred to, among the plural pixels in the three lines, is shifted every time the target pixel is updated, whereby the pixels C0–C9 used for generating the probability of the target pixel X are always shown.

For example, as shown in FIG. 4, in order to obtain the above-mentioned probability with respect to each pixel in a macroblock MB which is an image space comprising 16×16 pixels, the data of pixels (pixel values) in two lines U above the macroblock and the data of pixels in two columns L at the left side of the macroblock are needed in addition to the data of the respective pixels in the macroblock.

The data of pixels in the two lines U, the data of pixels in the two columns L, and the data of pixels in the macroblock MB are stored in a peripheral data buffer 232, switched by a selector 231. To be specific, the data of pixels in the two lines U are supplied from the memory 16 shown in FIG. 1, and the data of pixels in the two columns L are supplied from the buffer 212. Since the arithmetic decoding is performed macroblock by macroblock, the content of the peripheral data buffer is updated macroblock by macroblock.

Further, in the shift register 233, pixel values of the pixels C0–C9 in the vicinity of the target pixel X are generated, according to the position of the target pixel X, by using the data stored in the peripheral data buffer 232 and the data of a pixel which has been decoded just before the target pixel. Then, the probability of the target pixel is generated on the basis of a probability table stored in a memory 234, using the generated pixel values of the peripheral pixels, and the probability is sent to the arithmetic decoder 22.

In an arithmetic decoding circuit 221 as a component of the arithmetic decoder 22, normal arithmetic decoding is performed using the probability of the target pixel supplied from the probability calculator 23 and the data supplied from the stream buffer 24. The pixel value of the decoded pixel is sent to the data output unit 21 to be stored in a buffer 212.

Usually, information of shape data is one bit per pixel, and the result of arithmetic decoding is also one bit per pixel. Therefore, when the shape data is input or output to/from an external memory which usually has 16 bits or more, more than 15 bits go to waste. Accordingly, when inputting or outputting the shape data obtained by arithmetic decoding to/from the external memory, access to the shape data is performed in units of plural pixels. That is, in the buffer 212, one bit of shape data obtained by decoding is accumulated up to the access band width of the memory, for example, 16 bits, to be output. Although the unit of shape data is equal to the band width of the memory, it may be changed to the number of data which allows parallel access at one time, according to the construction of hardware. For example, it may be macroblock unit (256), block unit (16), or line unit of macroblock or block (16 or 8).

Further, in the data output unit 21, simultaneously with storage of data into the buffer 212, a macroblock shape decision circuit 211 decides whether the shape data in each of blocks constituting the macroblock are all 0 or not, and the result of this decision is output to the processor 11 (refer to FIG. 1). When all of the shape data of the pixels in the block are 0, this block is regarded as having no shape data (i.e., transparent). When all of the shape data of the pixels in the block are not 0, this block is regarded as being non-transparent. To decide whether each block is transparent or non-transparent by the macroblock shape decision circuit 211 reduces the arithmetic load on the texture data decoding and composition.

While in this first embodiment the shape data is expressed by one bit, the shape data may be expressed by information of two bits or more. In this case, the shift register 233, the memory 234, the buffer 212, and the arithmetic decoding circuit 221 should be modified so that they can process the shape data with extended bit width.

Figure 5:
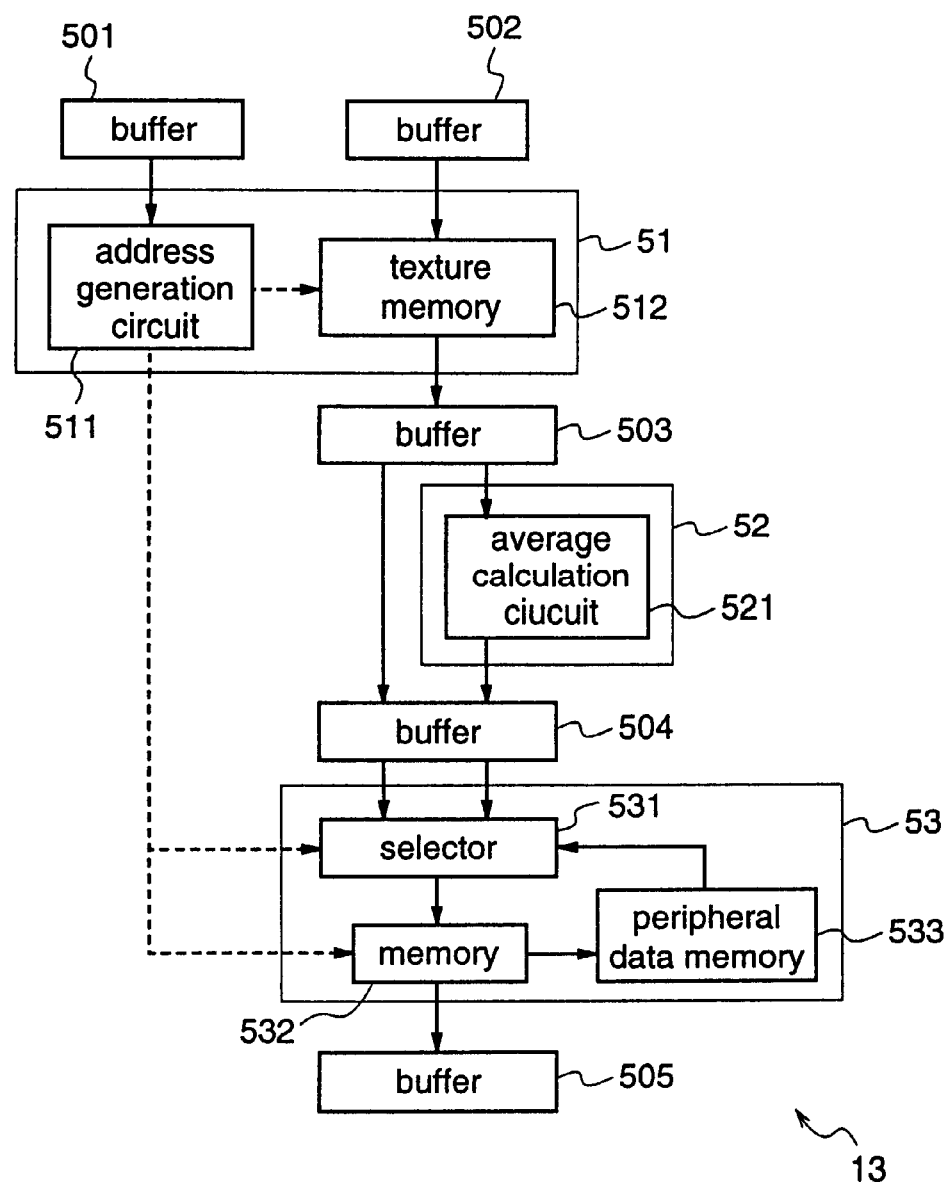
FIG. 5 is a block diagram illustrating an example of a padding engine as one of components of the image decoding apparatus according to the first embodiment.

FIG. 5 is a block diagram illustrating an example of the padding engine 13 included in the decoding apparatus according to the first embodiment.

This padding engine 13 comprises a pointer controller 51, an average calculator 52, and a data processor 53. These components are connected through buffers 501, 502, 503, 504, and 505 so as to achieve parallel processing. Although the parallel processing is typically performed in units of macroblocks, it may be performed in units of blocks or lines of a macroblock or block, depending on the relationship with other processes.

Figure 6:
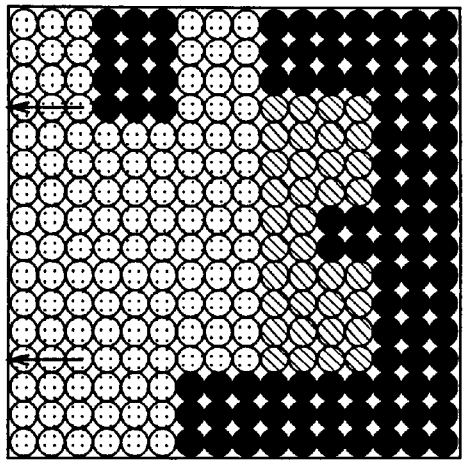
FIGS. 6(a)–6(c) are schematic diagrams for explaining the operation (padding process) of the padding engine shown in FIG. 5.
Figure 6:
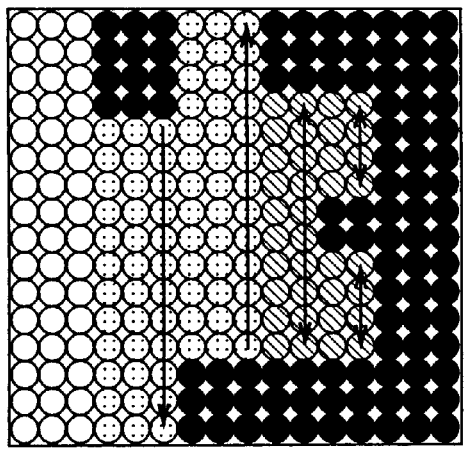
Figure 6:
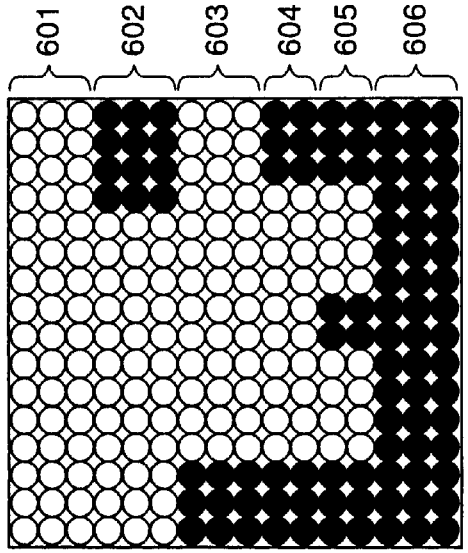

FIG. 6 is a diagram for explaining the operation of the padding engine 13 shown in FIG. 5.

The above-mentioned padding process is, fundamentally, to pad texture pixel values outside an image (object) with a certain value so that texture data corresponding to a non-rectangle image becomes texture data corresponding to a rectangle image.

The MPEG4 padding has three modes. The first mode is to pad the pixels outside the image with a predetermined value. The second mode is to pad the pixel values of pixels in a target macroblock to be padded, with the pixel values of peripheral pixels positioned in the horizontal or vertical direction in an adjacent macroblock. The third mode is to change the padding method according to the shape pattern of pixels in the macroblock as shown in FIG. 6.

In this first embodiment, the processor 11 selects one of the above-mentioned three padding mode, for each macroblock, using the shape information, and supplies it as padding mode information to an address generation circuit 511 shown in FIG. 5.

Initially, the third padding mode will be described with reference to FIGS. 6(*a*)–6(*c*).

In FIG. 6(*a*), pixels shown by black dots have a value indicating that the shape information (pixel value) is non-transparent (i.e., these pixels have the pixel value of the object), and pixels shown by white dots have a value indicating that the shape information (pixel value) is transparent (i.e., these pixels are outside the object).

In the third padding mode, as shown in FIG. 6(*b*), it is decided, for each line, whether the shape information has the value indicating "transparent" or the value indicating "non-transparent". In a line where only one boundary of objects (images) exits (e.g., each line in regions 602 and 603 shown in FIG. 6(*a*)), using the pixel value of a pixel adjacent to the boundary (boundary pixel), the pixel value of a pixel outside the object, which is positioned on the left or right side of the boundary pixel, is padded. In a line where two or more boundaries of objects (images) exist (e.g., each line in regions 604 and 605 shown in FIG. 6(*a*)), the pixel value of a pixel outside the object is padded with the average of pixel values of confronting two boundary pixels. Further, in a line where no boundary of objects (images) exists (e.g., each line in region 601 shown in FIG. 6(*a*)), the pixel value of a pixel in this line is padded with the pixel value of a pixel in the upper or lower line.

The respective components of the padding engine operate as follows.

In the pointer controller 51, the address generation circuit 511 performs pointer control on the basis of the inputted shape information, thereby generating addresses of pixels to be written in the memory 532 and a select signal of the selector 531.

To be specific, in the address generation circuit 511, the shape information is scanned from the head of a macroblock and, when non-transparent shape information is detected, its address is stored. With respect to the texture pixels up to the stored address, their addresses are generated so that the data of the texture pixel where the shape information exists is written in the memory 532.

As the scanning advances, the address of the second pixel where the shape information exists is stored, and the pixel value of the first pixel previously stored and the pixel value of the second pixel are supplied from the texture memory 512 to the average calculator. The average calculator calculates the average of the pixel values of the first pixel and the second pixel. The selector 531 selects the output from the average calculator 521, and the average of the pixel values of the first and second pixels is stored in the memory 532.

When there is no more shape information (in other words, texture pixels) in the line being scanned, the address of the second pixel is retained, and the pixel values up to the block boundary are padded with the pixel value of this second pixel. When there are third, fourth or more pixels (texture pixels) in the line being scanned, the above-mentioned average calculation is repeated in similar manner.

As described above, the third-mode padding process is realized by controlling the addresses of pixels to be written in the memory 532 by using the pointer controller 51.

On the other hand, in the first-mode padding process, a value for padding is written into the texture memory 512 from the processor 11, and the written value is stored as it is in the memory 532 corresponding to the target macroblock. In the second-mode padding process, the texture data in the adjacent macroblock for which a padding value has already been generated is stored in the peripheral data memory 533 of the padding engine 13, and the output of the peripheral data memory 533 is selected by the selector 531, and then the texture data of the adjacent macroblock is written in the memory 532.

While in the first embodiment the decision on the shape information is performed by the processor 11, the present invention is not restricted thereto. When the hardware scale has a margin, the padding engine may be provided with a mode decision unit for deciding the padding mode from the shape information, and switching the operation. Also in this case, the same operation as described for the third embodiment is achieved. Further, the mode decision unit may have a buffer like the other components so as to perform parallel processing with the other components.

Figure 7:
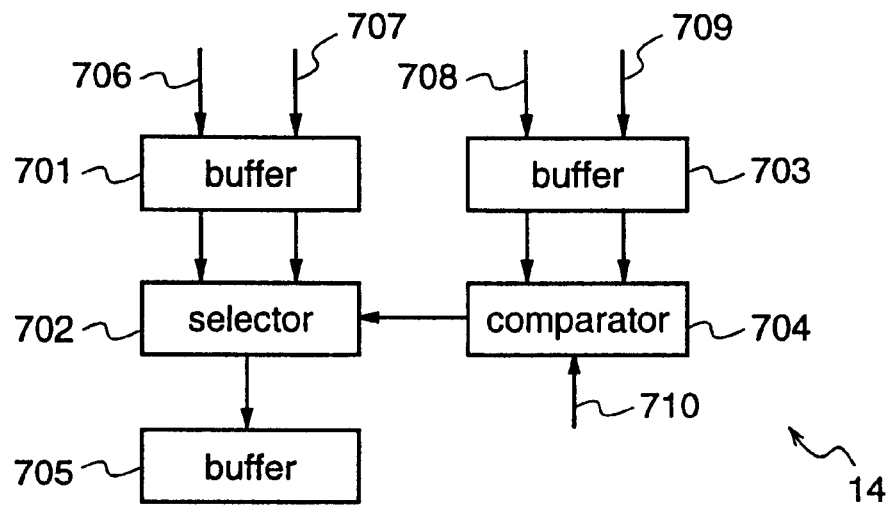
FIGS. 7(a) and 7(b) are diagrams for explaining the construction and operation of a composition engine as one of components of the image decoding apparatus according to the first embodiment, respectively.
Figure 7:
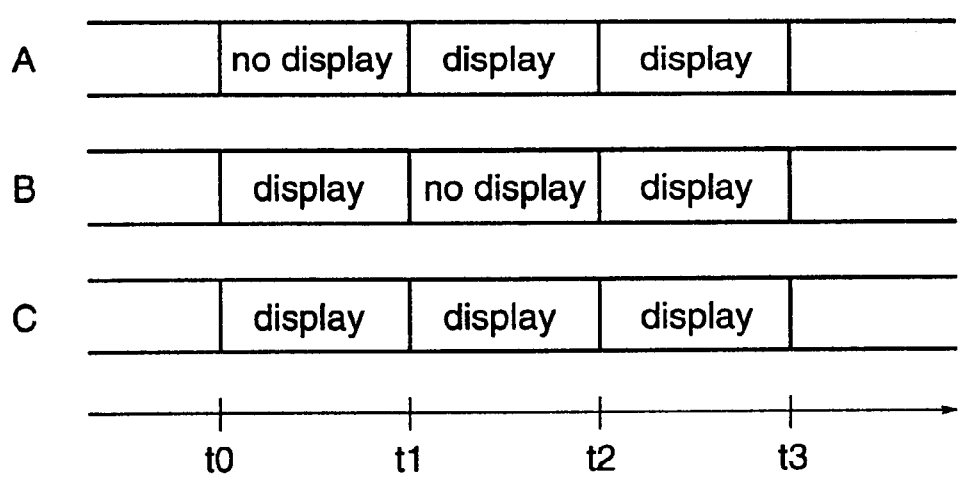

FIG. 7(*a*) is a block diagram illustrating an example of the composition engine 14 as a component of the decoding LSI according to the first embodiment.

Assuming that an image A and an image B are to be composited, the composition engine 14 receives texture data 706 and shape data 708 of the image A, and texture data 707 and shape data 709 of the image B. Although these data may be inputted pixel by pixel, these data are usually inputted frame by frame, or field by field, or VOP by VOP (Video Object Plane) based on MPEG4.

The reason is as follows. Since error detection and correction are performed in the above-described units for data input, when an error exists in a VOP to be decoded and thereby this VOP cannot be decoded, a VOP which has previously been decoded is displayed instead. When error correction is performed in smaller units, image composition may be performed block by block, macroblock by macroblock, slice by slice, or packet by packet (MPEG4), which is smaller than frame or VOP. Further, data access to the composition engine 14 is performed through the buffers 701, 703, and 705 to make parallel operation with other tasks possible.

In the composition engine 14, the shape data 708 and 709 of the inputted images A and B and a display order 710 are input to a comparator 704, wherein the shape data of the images A and B are compared pixel by pixel. When the display order input 710 specifies that the image A should be superimposed on the image B, it is decided whether the shape data 708 of the image A is transparent or not. When it is not transparent, a select signal is output so as to instruct the selector 702 to output the texture data 706 of the image A. When the shape data 708 of the image A is transparent, it is decided whether the shape data 709 of the image B is transparent or not. When it is not transparent, a select signal is output so as to instruct the selector 702 to output the texture data of the image B. When it is transparent, a select signal is output so as to instruct the selector 702 to output no data.

The image data corresponding to the composite image so generated is temporarily stored in the memory 16 of the image decoding apparatus.

When compositing three or more images, another image (third image) is superimposed on the composite image stored in the memory 16.

As described above, repeating the composition process by the composition engine allows composition of many images. When compositing many images, it is desirable to start composition from an image to be displayed at the base, such as background, to simplify the processing.

For example, when compositing three images A, B, and C for display, the composition engine 14 may composite images to be displayed at the same time, as shown in FIG. 7(b). For example, the images B and C are composited at time t0-t1, the images A and C are composited at time t1-t2, and the images A, B, and C are composited at time t2-t3.

As described above, the image decoding apparatus according to the first embodiment is provided with the padding means for padding decoded texture data, the arithmetic decoding means for subjecting coded shape data to arithmetic decoding, and the composition means for compositing plural pieces of texture data to generate composite image data. The padding means, the arithmetic decoding means, and the composition means are constituted by hardware circuits (i.e., the padding engine 13, the arithmetic decoding engine 12, and the composition engine 14, respectively). Therefore, the image decoding apparatus can perform high-speed decoding on a bitstream corresponding to plural objects such as images or the like, with reduced cost of hardware circuits performing the decoding process.

While in this first embodiment the decoding LSI is constructed such that the composite image data is temporarily stored in the memory 16 of the decoding apparatus, the construction of the decoding LSI is not restricted thereto. The composition engine 14 may have a memory to store the composite image data.

Further, while in this first embodiment the composition engine 14 uses a comparator and a selector for composition, the construction of the composition engine is not restricted thereto.

For example, when the shape information is not binary data but multi-valued data to express "semi-transparent" or the like, plural multipliers and an adder may be used instead of the comparator and the selector.

To be specific, when compositing two images, the composition engine is provided with two multipliers for multiplying texture data by multi-valued shape data, and an adder for adding the outputs from the multipliers are used. In this case, the output from the adder is used as composite image data.

Further, although in this first embodiment the shape data of the images A and B are used for composition, when one of the images is rectangle in shape and therefore has no shape data as in the case of compositing an object and a background, the shape data of the object may be set at a value indicating "nontransparent".

Furthermore, although in this first embodiment decoding is described, the basic principle of the present invention is applicable to an LSI performing coding. In this case, the arithmetic decoding engine is constructed as follows. The probability calculator is used as it is, and the arithmetic decoder is replaced with an arithmetic encoder. Further, the data storage unit is constructed so that the shape decision circuit receives the shape data from the bus, and input and output of one-bit shape data to the buffer are inverted. Thereby, the arithmetic decoding engine can be altered to an arithmetic coding engine.

[Embodiment 2]

Figure 11:
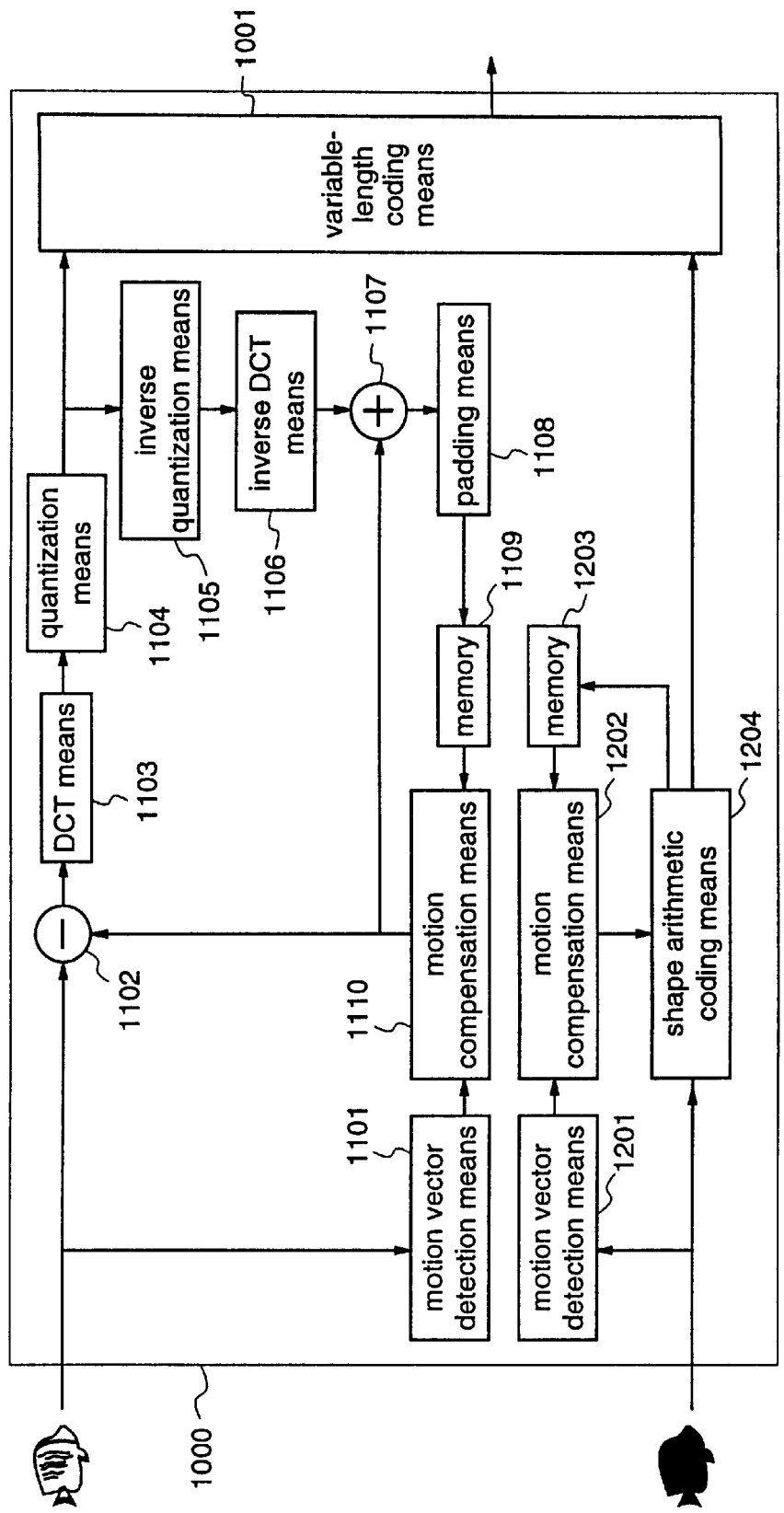
FIG. 11 is a diagram illustrating functional blocks for implementing the coding process based on MPEG4 coding.

Hereinafter, an image coding apparatus according to a second embodiment of the present invention will be described with reference to FIGS. 8 and 11. FIG. 11 is a block diagram illustrating an image coding apparatus 1000.

The image coding apparatus 1000 includes a subtraction means 1102 for calculating difference texture data which is a difference between inputted texture data and predictive texture data; a DCT means 1103 for subjecting the difference texture data to discrete cosine transform to output frequency-domain texture data; and a quantization means 1104 for quantizing the frequency-domain texture data.

The image coding apparatus 1000 further includes an inverse quantization means 1105 for subjecting the output from the quantization means 1104 to inverse quantization to restore the frequency-domain texture data; an inverse DCT means 1106 for subjecting the restored frequency-domain texture data to inverse DCT to restore space-domain difference texture data; and an addition means 1107 for adding the space-domain difference texture data and the predictive texture data to restore the texture data.

The image coding apparatus 1000 further includes a padding means 1108 for subjecting the restored texture data outputted from the addition means 1107 (object decoded texture data) to a padding process identical to that described for the first embodiment to generate padded texture data; a memory 1109 for storing the padded texture data; a texture motion vector detection means 1101 for performing motion detection on the basis of the inputted texture data to output a motion vector; and a motion compensation means 1110 for motion-compensating the padded texture data stored in the memory 1109 on the basis of the motion vector to generate the above-described predictive texture data.

Furthermore, the image coding apparatus 1000 includes an arithmetic shape coding means 1204 for subjecting input shape data to arithmetic shape coding including object decoding on the basis of predictive shape data to output arithmetically-coded shape data and object-arithmetically-decoded shape data; a memory 1203 for storing the object-arithmetically-decoded shape data; a motion vector detection means 1201 for performing motion detection on the basis of the inputted shape data to output a shape motion vector; and a motion compensation means 1202 for motion-compensating the object-arithmetically-decoded shape data stored in the memory 1203 on the basis of the motion vector to generate the above-described predictive shape data.

Furthermore, the image coding apparatus 1000 includes a variable-length coding means for subjecting the output from the quantization means 1104 and the arithmetically-coded shape data to variable-length coding to output these data as a bitstream.

In this second embodiment, the image coding apparatus is constituted by a coding LSI, and this coding LSI is provided with hardware circuits corresponding to predetermined ones of the respective functional blocks described above.

Figure 8:
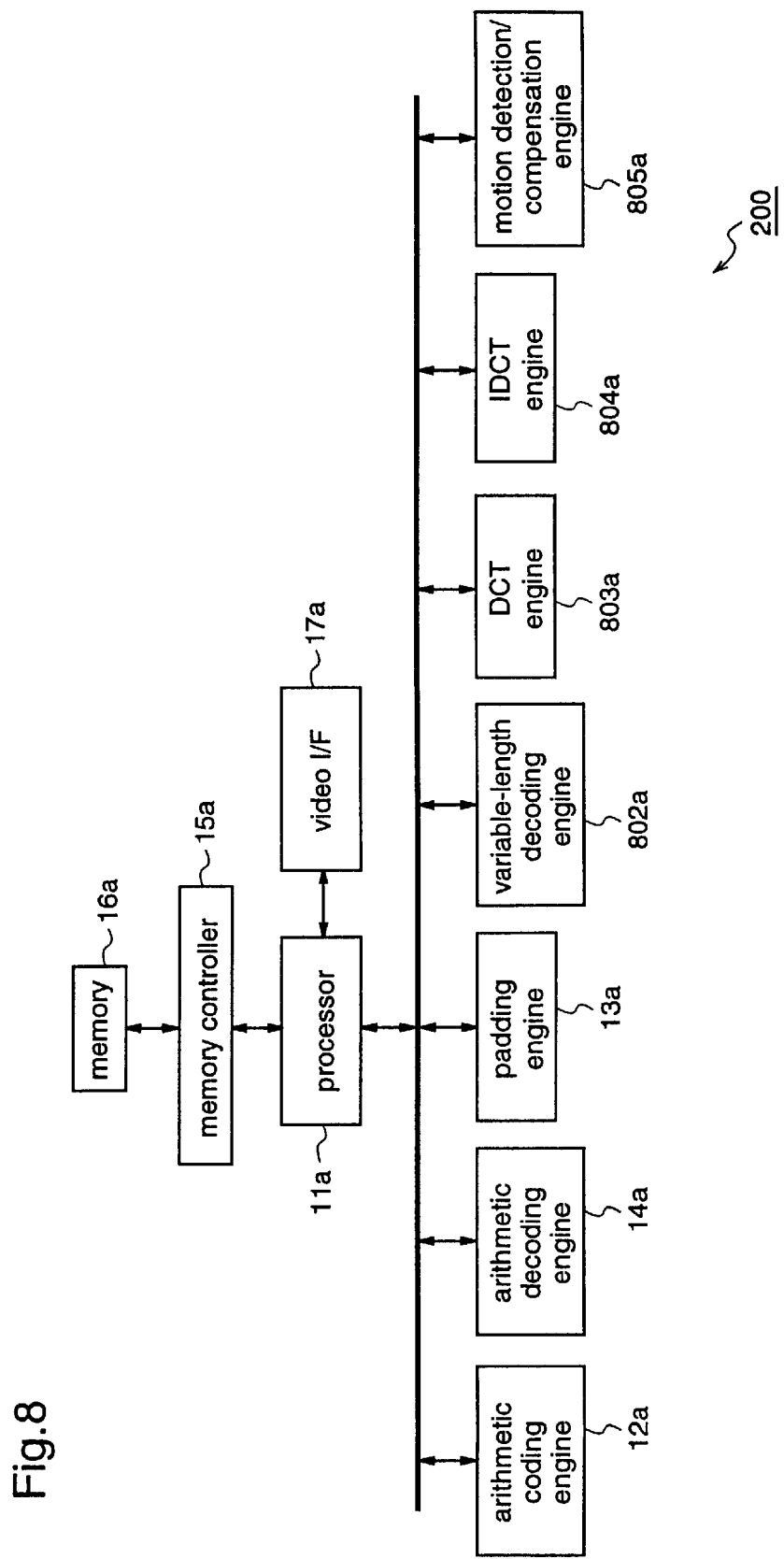
FIG. 8 is a block diagram for explaining an image coding apparatus according to a second embodiment of the present invention.
Figure 9:
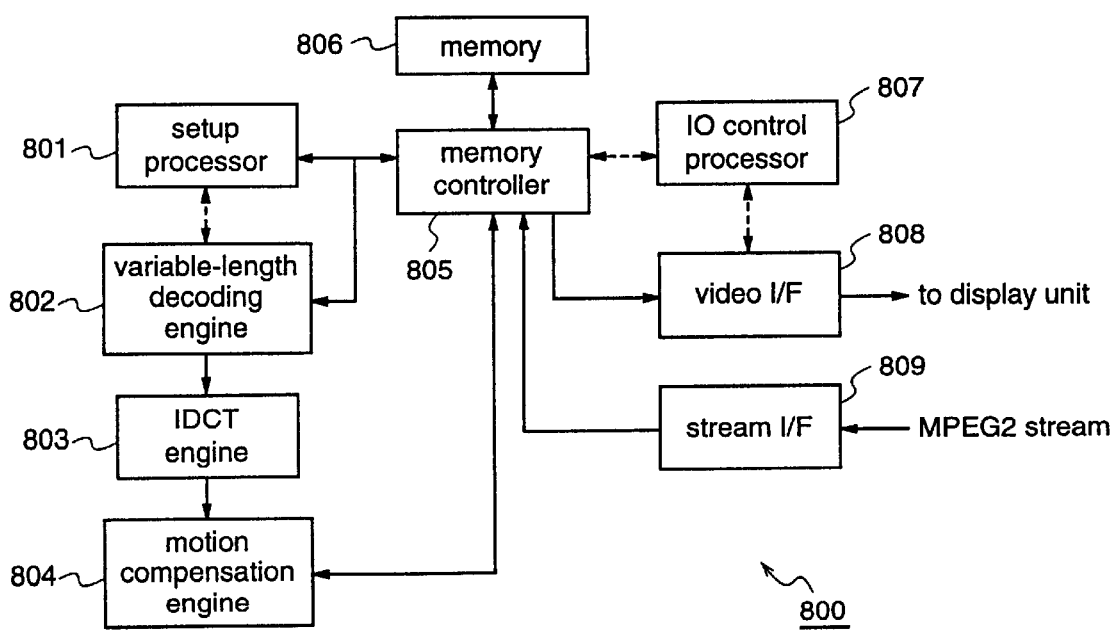
FIG. 9 is a block diagram for explaining the conventional image decoding apparatus.
Figure 10:
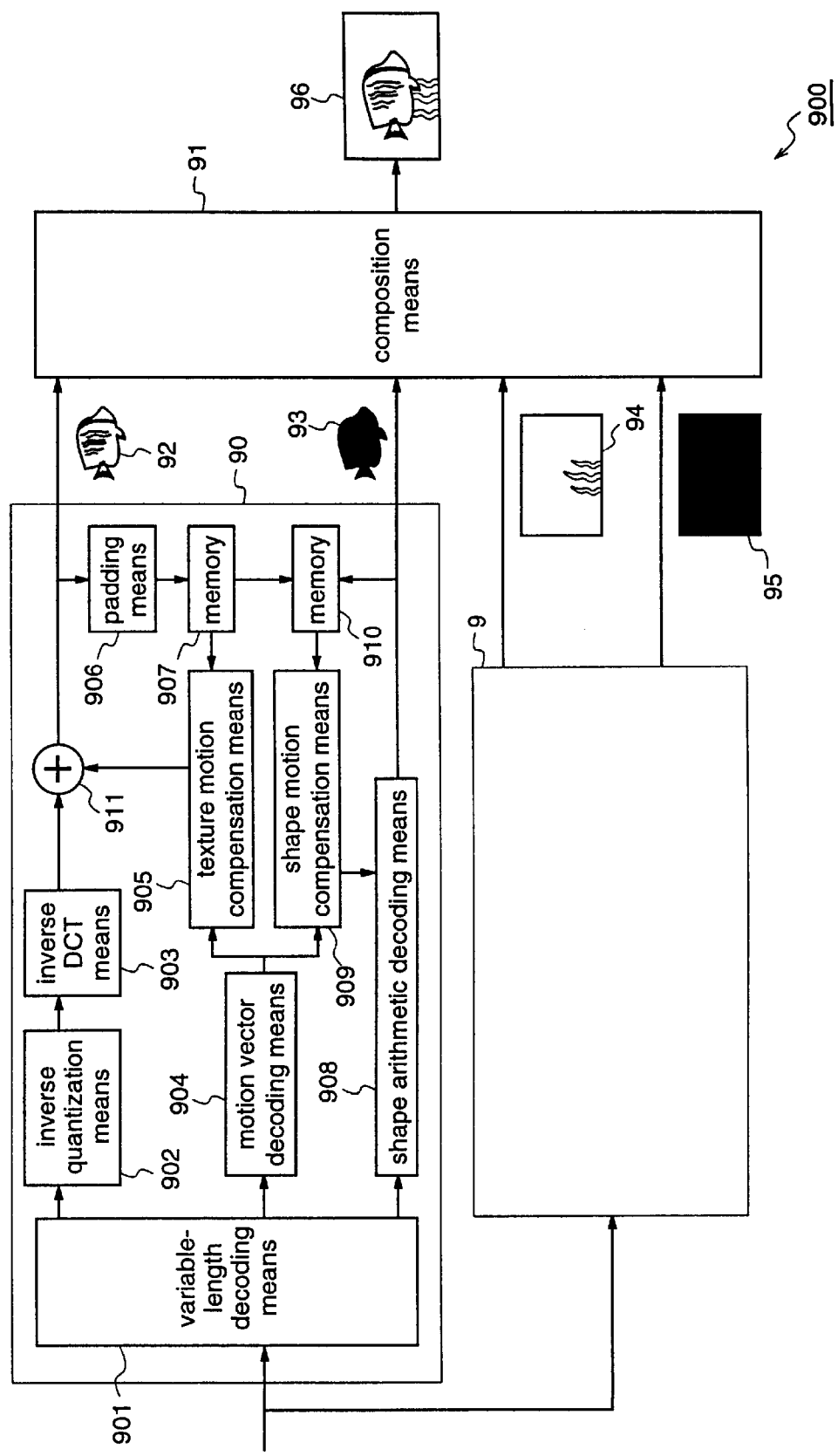
FIG. 10 is a diagram illustrating functional blocks for implementing the process of decoding a bitstream obtained in a coding process based on MPEG4 coding.

FIG. 8 is a block diagram illustrating the construction of a coding LSI 200 according to the second embodiment.

The coding LSI (image coding apparatus) 200 performs MPEG4 image coding.

The coding LSI 200 includes a processor 11a for controlling the respective components of the LSI 200; a DCT engine 803a for subjecting texture data included in digital image data corresponding to an object to discrete cosine transform (DCT) to generate frequency-domain texture data; an IDCT engine 804a for subjecting the frequency-domain texture data to inverse DCT to restore space-domain texture data; and a padding engine 13a for subjecting the restored texture data to a padding process identical to that described for the first embodiment to generate padded texture data.

The coding LSI 200 further includes an arithmetic coding engine 12a for subjecting shape data included in digital image data corresponding to an object to arithmetic coding to generate arithmetically-coded shape data; and an arithmetic decoding engine 14a for subjecting the arithmetically-coded shape data to arithmetic decoding to restore the shape data.

Furthermore, the coding LSI 200 includes a motion detection/compensation engine 805a for performing motion detection and motion compensation on the texture data and the shape data to generate predictive texture data and predictive shape data; and a variable-length coding engine 802*a* for performing variable-length coding on the data obtained by quantizing the frequency-domain texture data and on the arithmetically-coded shape data.

Furthermore, the coding LSI 200 includes a memory 16*a* for storing the texture data and shape data included in the input digital image data, the arithmetically-coded shape data, the arithmetically-decoded shape data, the padded texture data, the frequency-domain texture data, and the restored space-domain texture data; a memory controller 15*a* for controlling access to data stored in the memory 16*a;* and a video IF 17*a* to which the digital image data is supplied from the outside.

In the coding LSI 200, the respective engines (i.e., the arithmetic coding engine 12*a,* the padding engine 13*a,* the arithmetic decoding engine 14*a,* the variable-length coding engine 802*a,* the DCT engine 803*a,* the IDCT engine 804*a,* and the motion detection/compensation engine 805) are constituted by hardware circuits, and the processes corresponding to the functional blocks shown in FIG. 11, other than the processes to be performed by the respective engines, are performed by the processor 11*a.*

The padding engine 13*a* and the arithmetic decoding engine 14*a* are identical in construction to those described for the first embodiment. Further, the arithmetic coding engine 12*a* is obtained by modifying the constructions of the arithmetic decoder and the data storage unit included in the arithmetic decoding engine 14*a* such that arithmetic coding is performed instead of arithmetic decoding.

Next, the operation will be described.

The coding LSI 200 performs coding on digital image data according to the MPEG4 coding procedure.

That is, when digital image data is input to the video IF 17*a* of the coding LSI 200, the image data is stored in the memory 16*a* through the processor 11*a* and the memory controller 15*a.*

Next, texture data and shape data included in the image data are subjected to motion detection by the motion detection/compensation engine 805*a,* thereby generating a texture motion vector and a shape motion vector.

Further, in the processor 11*a,* difference texture data, which is a difference between the texture data and predictive texture data, is generated, and this difference texture data is converted to frequency-domain texture data by the DCT engine 803*a* and stored in the memory 16*a.* In the processor 11*a,* this frequency-domain texture data is quantized, and the quantized frequency-domain texture data is inversely quantized.

The quantized frequency-domain texture data is supplied to the variable-length coding engine 802*a,* and the frequency-domain texture data which has been restored by inverse quantization is supplied to the IDCT engine 804*a.*

Further, in the IDCT engine 804*a,* the frequency-domain texture data is restored to space-domain texture data, and this space-domain texture data is added to the predictive texture data in the processor 11*a,* thereby generating object decoded texture data. This object decoded texture data is padded by the padding engine 13*a* and stored in the memory 16*a.*

On the other hand, when the shape data is supplied to the arithmetic coding engine 12*a,* the shape data is arithmetically coded on the basis of predictive shape data to generate arithmetically-coded shape data, and this shape data is supplied to the variable-length coding engine 802*a.* Further, the arithmetically-coded shape data is arithmetically decoded by the arithmetic decoding engine 14*a* to be restored to object-arithmetically-decoded shape data, and this shape data is restored in the memory 16*a.*

In the motion detection/compensation engine 805*a,* the padded texture data and the object-arithmetically-decoded shape data, which are stored in the memory 16*a,* are subjected to motion compensation, on the basis of the shape motion vector and the texture motion vector, thereby generating the predictive texture data and the predictive shape data. These data are stored in the memory 16*a.*

Then, the variable-length coding engine 802*a* performs variable-length coding on the quantized frequency-domain texture data and the arithmetically-coded shape data, and outputs coded image data.

As described above, the image decoding apparatus according to this second embodiment is provided with the padding means for padding the texture data, the arithmetic coding means for arithmetically coding the shape data to output arithmetically-coded shape data, and the arithmetic decoding means for arithmetically decoding the arithmetically-coded shape data, wherein the padding means, the arithmetic coding means, and the arithmetic decoding means are constituted by hardware circuits (i.e., the padding engine 13*a,* arithmetic coding engine 12*a,* and arithmetic decoding engine 14*a,* respectively). Therefore, the apparatus can perform high-speed MPEG4 compressive coding on digital image data, with reduced cost of the hardware circuits performing the coding process.

While in the first and second embodiments the processor and the respective engines are mounted on the same LSI, the constructions of the decoding LSI and the coding LSI are not restricted thereto.

For example, the processor and the engines for MPEG4 coding (or the engines for MPEG4 decoding) may be mounted on different LSI circuits, with the same effects as described above. Further, the processor may be constituted as an independent CPU, and the respective engines may be constituted by external hardware. In this case, those engines corresponding to the functional blocks which are not common to the functional blocks of MPEG2 (i.e., the arithmetic decoding engine, padding engine, composition engine, and the like) may be constituted by other hardware circuits outside the decoding LSI. Thus, the decoding LSI according to the first embodiment and the coding LSI according to the second embodiment can alter their physical hardware constructions according to the applications.

As described above, the image decoding apparatus of the present invention is provided with the padding means for padding decoded texture data, the arithmetic decoding means for subjecting coded shape data to arithmetic decoding, and the composition means for compositing a plurality of texture data to generate composite image data, and the padding means, the arithmetic decoding means, and the composition means are respectively constituted by hardware circuits (dedicated engines). Therefore, the apparatus can perform high-speed decoding on a bitstream corresponding to plural objects, such as images, which are compressively coded by the MPEG4 coding method. Further, the cost of the hardware circuits performing the decoding process is minimized.

Furthermore, the image coding apparatus of the present invention is provided with the padding means for padding texture data, the arithmetic coding means for subjecting shape data to arithmetic coding to output arithmetically-coded shape data, and the arithmetic decoding means for subjecting the arithmetically-coded shape data to arithmetic decoding, and the padding means, the arithmetic coding means, and the arithmetic decoding means are respectively constituted by hardware circuits (dedicated engines). Therefore, the apparatus can perform high-speed MPEG4 compressive coding on digital image data. Further, the cost of the hardware circuits performing the coding process is minimized.

What is claimed is:

1. An image decoding apparatus for decoding coded image data which includes coded texture data obtained by coding texture data expressing the luminance or chrominance of an image, and coded shape data obtained by coding shape data expressing the shape of the image, thereby generating decoded image data including decoded texture data and decoded shape data, said apparatus comprising:

arithmetic decoding means for subjecting the coded shape data to arithmetic decoding to output the decoded shape data;

padding means for padding the pixel values of pixels positioned outside a target image to be decoded, in an image space including the target image, which image space is constituted by the decoded texture data;

composition means for compositing the decoded texture data of the target image and texture data of another image;

at least one of the arithmetic decoding means, the padding means, and the composition means being constituted by a hardware circuit; and a processor for controlling the hardware circuit.

2. An image decoding apparatus including an arithmetic decoding means which comprises a hardware circuit, performs arithmetic decoding on coded shape data obtained by performing arithmetic coding on shape data expressing the shape of an image, and outputs decoded shape data, said hardware circuit comprising:

a probability calculator for calculating the probability that a target pixel to be subjected to arithmetic decoding has a predetermined pixel value, in a shape image space corresponding to the shape data, on the basis of the pixel values of plural pixels which have already been subjected to arithmetic decoding;

an arithmetic decoder for calculating the pixel value of the target pixel on the basis of the coded shape data, and the probability of the target image which is output from the probability calculator; and a data output unit for outputting the pixel values outputted from the arithmetic decoder, for every predetermined number of pixels at the same time.

3. The image decoding apparatus of claim 2, wherein said hardware circuit constituting the arithmetic decoding means allows parallel processing among calculation of probability by the probability calculator, calculation of pixel values by the arithmetic decoder, and output of pixel values by the data output unit.

4. The image decoding apparatus of claim 2, wherein said hardware circuit constituting the arithmetic decoding means performs calculation of probability by the probability calculator, calculation of pixel values by the arithmetic decoder, and output of the pixel values by the data output unit, for every predetermined number of pixels.

5. The image decoding apparatus of claim 2 wherein:

said data output unit has a data storage for storing the pixel values outputted from the arithmetic decoder, for every predetermined number of pixels as a unit; and the unit of pixels to be stored in the data storage is equivalent to the data width which is the number of data to be parallel-accessed to a processor controlling the hardware circuit or a memory storing the coded shape data and the decoded shape data.

6. The image decoding apparatus of claim 2 wherein:

said data output unit has a data storage for storing the pixel values outputted from the arithmetic decoder, for every predetermined number of pixels as a unit; and the unit of pixels to be stored in the data storage is a multiple of the number of pixels in one pixel line in a rectangle image space comprising a predetermined number of pixels as a unit of the arithmetic decoding.

7. The image decoding apparatus of claim 2, wherein said data output unit comprises:

a data storage for storing the pixel values outputted from the arithmetic decoder, for every predetermined number of pixels as a unit of storage; and a shape information decision circuit for deciding whether or not the pixel values constituting the unit of storage are pixels outside the image.

8. The image decoding apparatus of claim 1 wherein:

said processor decides a padding method according to the inputted shape data, and outputs information indicating the decided padding method to the padding means; and said padding means performs padding on the basis of the decided padding method.

9. The image decoding apparatus of claim 1, wherein said padding means performs padding with, as a unit, a multiple of the number of pixels in one pixel line in a rectangle image space comprising a predetermined number of pixels as a unit of the arithmetic decoding.

10. An image decoding apparatus for decoding coded image data which includes coded texture data obtained by coding texture data expressing the luminance or chrominance of an image, and coded shape data obtained by coding shape data expressing the shape of the image, thereby generating decoded image data including decoded texture data and decoded shape data, said apparatus including:

padding means comprising a hardware circuit, for padding the pixel values of pixels positioned outside the image, in an image space comprising the decoded texture data; and said hardware circuit constituting the padding means comprising:

a pointer controller for deciding whether each pixel is a pixel inside the image or a pixel outside the image in the image space, using the decoded shape data, and indicating pixels to be used for padding;

an average calculator for calculating the average of the pixel values of the pixels indicated by the pointer controller; and a data processor for generating padding pixel values on the basis of the pixel values of the pixels indicated by the pointer controller, the average calculated by the average calculator, and the decoded shape data and decoded texture data, and padding the pixel values of pixels to be padded with the padding pixel values.

11. The image decoding apparatus of claim 10, wherein said padding means allows parallel processing among designation of pixels by the pointer controller, average calculation by the average calculator, and padding of pixel values by the data processor.

12. The image decoding apparatus of claim 10 wherein:

said padding means performs padding for every block comprising a predetermined number of pixels in the image space; and said padding means is provided with a memory for storing already-decoded pixel values which are required for padding of blocks to be processed after a target block which is currently subjected to padding.

13. The image decoding apparatus of claim 1, wherein said composition means receives decoded texture data corresponding to a target image to be decoded, decoded shape data corresponding to the target image, and texture data corresponding to another image to be used for composition, and composites the decoded texture data of the target image and the texture data of the other image on the basis of the decoded shape data, and outputs composite texture data.

14. The image decoding apparatus of claim 1, wherein said composition means composites, as a single unit, images to be displayed at the same time.

15. An image coding apparatus for subjecting texture data expressing the luminance or chrominance of an image and shape data expressing the shape of the image to coding including object decoding, thereby outputting coded shape data and coded texture data and generating object decoded image data including object decoded shape data and object decoded texture data, said apparatus comprising:

arithmetic coding means for subjecting the shape data to arithmetic coding including object arithmetic decoding, thereby outputting the coded shape data and generating the object decoded shape data;

padding means for padding the pixel values of pixels positioned outside the image, in an image space comprising the object decoded texture data;

at least one of the arithmetic coding means and the padding means being constituted by a hardware circuit; and a processor for controlling the hardware circuit.

16. An image coding apparatus for subjecting texture data expressing the luminance or chrominance of an image and shape data expressing the shape of the image to coding including object decoding, thereby outputting coded shape data and coded texture data and generating object decoded image data including object decoded shape data and object decoded texture data, said apparatus including:

padding means comprising a hardware circuit, for padding the pixel values of pixels positioned outside the image, in an image space comprising the object decoded texture data; and said hardware circuit constituting the padding means comprising:

a pointer controller for deciding whether each pixel is a pixel inside the image or a pixel outside the image by using the object decoded shape data, and indicating pixels to be used for padding;

an average calculator for calculating the average of the pixel values of the pixels indicated by the pointer controller; and a data processor for generating padding pixel values on the basis of the pixel values of the pixels indicated by the pointer controller, the average calculated by the average calculator, and the object decoded shape data and object decoded texture data, and padding the pixel values of pixels to be padded with the padding pixel values.

* * * * *